(12) United States Patent
Jeganathan et al.

(10) Patent No.: US 7,802,037 B2
(45) Date of Patent: Sep. 21, 2010

(54) CONTROL OF AN ACTUATOR-SENSOR-INTERFACE COMPATIBLE DEVICE USING A REMOTE INTELLIGENCE DEVICE

(75) Inventors: Srinivasan Jeganathan, Karnataka (IN); Ganapathy Kalyana Sundaram, Karnataka (IN); Nanda Kishore Pamidi, Khammam (IN); Sirosh Sivasankaran, Karnataka (IN)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 12/265,267

(22) Filed: Nov. 5, 2008

(65) Prior Publication Data

US 2010/0115166 A1 May 6, 2010

(51) Int. Cl.
*G06F 13/00* (2006.01)
(52) U.S. Cl. ..................................................... 710/110
(58) Field of Classification Search .................. 710/110; 370/282; 714/52
See application file for complete search history.

(56) References Cited

U.S. PATENT DOCUMENTS

| | | | | |
|---|---|---|---|---|
| 5,955,859 | A * | 9/1999 | Baurand et al. | 318/672 |
| 6,123,585 | A * | 9/2000 | Hussong et al. | 439/652 |
| 6,285,096 | B1 * | 9/2001 | Muller et al. | 307/326 |
| 6,294,889 | B1 * | 9/2001 | Briant et al. | 318/473 |
| 6,446,202 | B1 * | 9/2002 | Krivoshein et al. | 713/1 |
| 6,690,755 | B1 * | 2/2004 | Pulvirenti et al. | 375/350 |
| 6,826,590 | B1 | 11/2004 | Glanzer et al. | |
| 6,907,331 | B2 * | 6/2005 | Paquet | 701/36 |
| 6,963,814 | B2 * | 11/2005 | Jones et al. | 702/119 |
| 7,246,194 | B2 * | 7/2007 | Train et al. | 710/311 |
| 7,624,219 | B2 * | 11/2009 | Fuessl et al. | 710/305 |
| 2008/0004727 | A1 | 1/2008 | Glanzer et al. | |

FOREIGN PATENT DOCUMENTS

DE 4133636 A1 4/1993

OTHER PUBLICATIONS

ASI Overview date unknown. Evidence that ASI was in use in 1994.*
Barriuso Poy A. et al.: "The detector control system of the ATLAS experiment"; Journal of Instrumentation, Institute of Physics Publishing, Bristol, GB, vol. 3, No. 5, May 1, 2008, p. P05006, XP020140041; ISSN: 1748-0221; 43 pgs.
European Search Report for Application No. 09173969.8; Date of Mailing: Feb. 19, 2010; 7 pgs.

* cited by examiner

*Primary Examiner*—Paul R Myers
(74) *Attorney, Agent, or Firm*—Cantor Colburn, LLP (57) ABSTRACT

A communication network that includes a master device, an actuator-sensor-interface (AS-I) communication bus, a device configured to be monitored and controlled, and a slave device in communication with the master device via the AS-I communication bus. The device that is configured to be monitored and controlled, is operatively connectable to the slave device, and the slave device is configured to receive commands from the master device via the AS-I communication bus, and to execute the commands to control the device.

20 Claims, 8 Drawing Sheets

| Operation Table | | | |
|---|---|---|---|
| Power relay | Opto sensor | Contacts Status | Operation Status |
| OFF | Open | Open | Normal |
| ON | Interrupted | Closed | Normal |
| OFF | Interrupted | Closed | Abnormal closed |
| ON | Open/No Change | Open/No Change | Abnormal open |

CONTROL OF AN ACTUATOR-SENSOR-INTERFACE COMPATIBLE DEVICE USING A REMOTE INTELLIGENCE DEVICE

BACKGROUND OF THE INVENTION

This invention relates to control of an actuator-sensor-interface (AS-I) compatible device. More particularly, this invention relates a communication network for controlling an actuator sensor interface (AS-I) compatible device using a remote intelligence device.

In electrical control systems, it is desirable to provide status information of various control elements, such as an electromagnetic contactor. For example, it is desirable that the system controller knows whether the electromagnetic contactor is operating under a normal condition or an abnormal condition, such as operating during a current overload condition, for example. In conventional control systems, a local device (i.e., a slave device) located at the electromagnetic contactor is equipped with the intelligence to determine the operating state of the electromagnetic contactor, and reports the information to a remote monitoring device (i.e., a master device). In a control system that includes various control elements, the task of equipping each local device with the intelligence necessary, may increase manufacturing costs.

Therefore, it would be desirable to provide a system having a remote, centralized intelligence device (i.e., a master device) capable of determining the operating state of a device such as an electromechanical device, and monitoring and controlling the device.

BRIEF DESCRIPTION OF THE INVENTION

An exemplary embodiment of the present invention provides a communication network that includes a master device, an actuator-sensor-interface (AS-I) communication bus, a device configured to be monitored and controlled, and a slave device in communication with the master device via the AS-I communication bus. The device that is configured to be monitored and controlled, is operatively connectable to the slave device, and the slave device is configured to receive commands from the master device via the AS-I communication bus, and to execute the commands to control the device.

Additional exemplary embodiments of the present invention provide a system and method for controlling an device via an AS-I communication network Additional features and advantages are realized through the techniques of exemplary embodiments of the invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
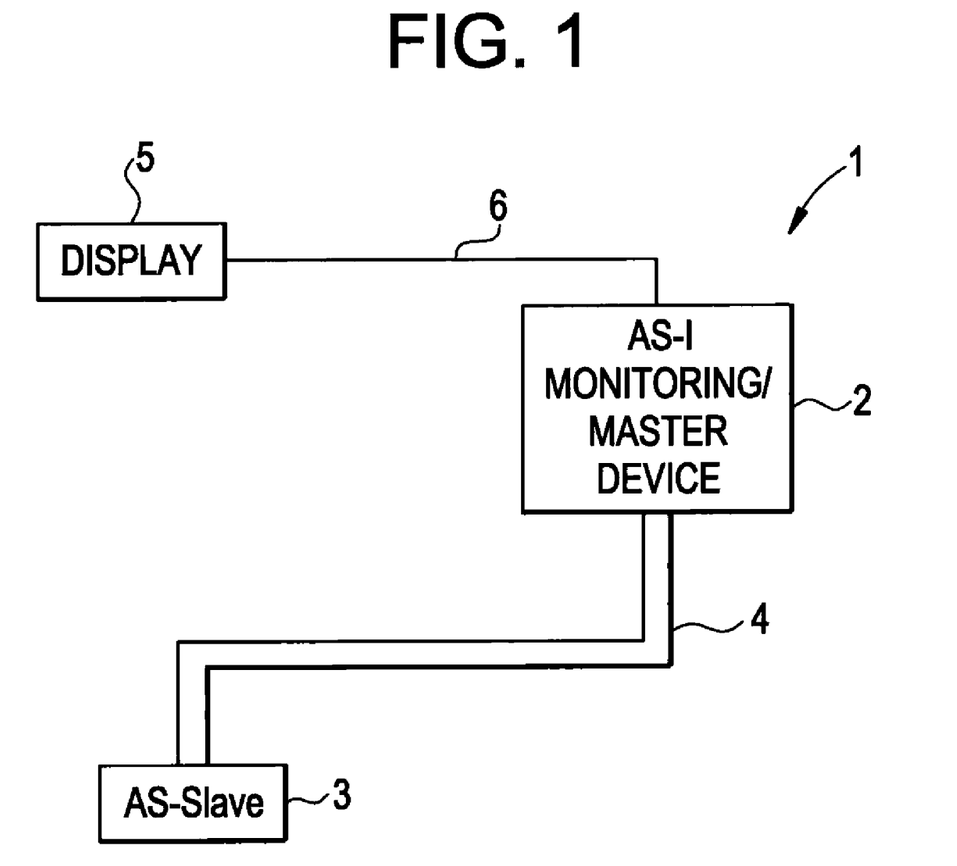
FIG. 1 is a block diagram of an AS-I communication network that can be implemented within embodiments of the present invention.

Turning now to the drawings in greater detail, it will be seen that in FIG. 1, there is an AS-I communication network 1 that includes a remote intelligence device, i.e., a master device 2, an AS-I communication module i.e., a slave device 3 in communication with the master device 2 via an AS-I communication bus 4. The AS-I communication network 1 further includes a display unit 5 connected to the master device 2 via a converter 6, for example.

Figure 2:
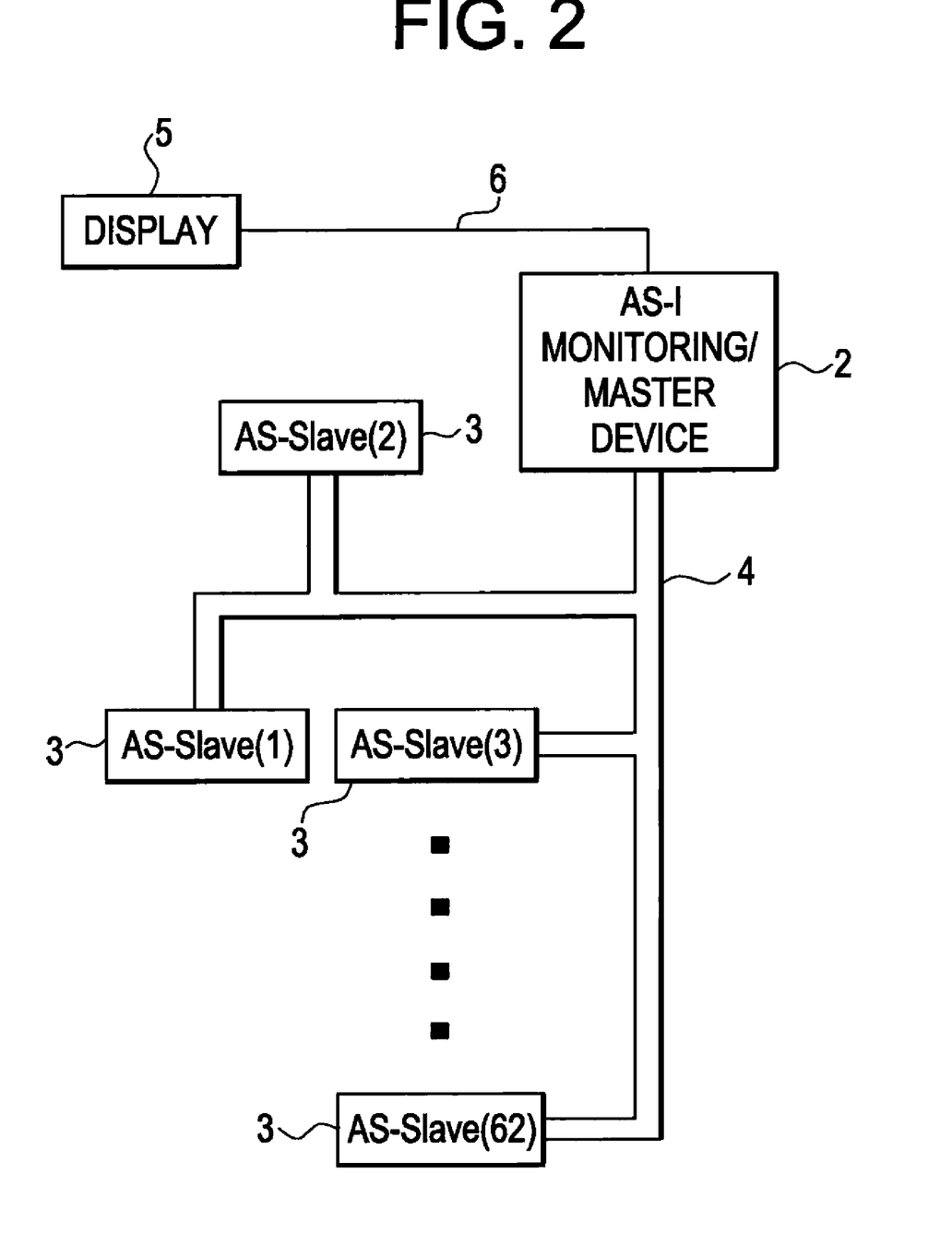
FIG. 2 is a diagram of an AS-I communication network that can be implemented within alternative embodiments of the present invention.
Figure 3:
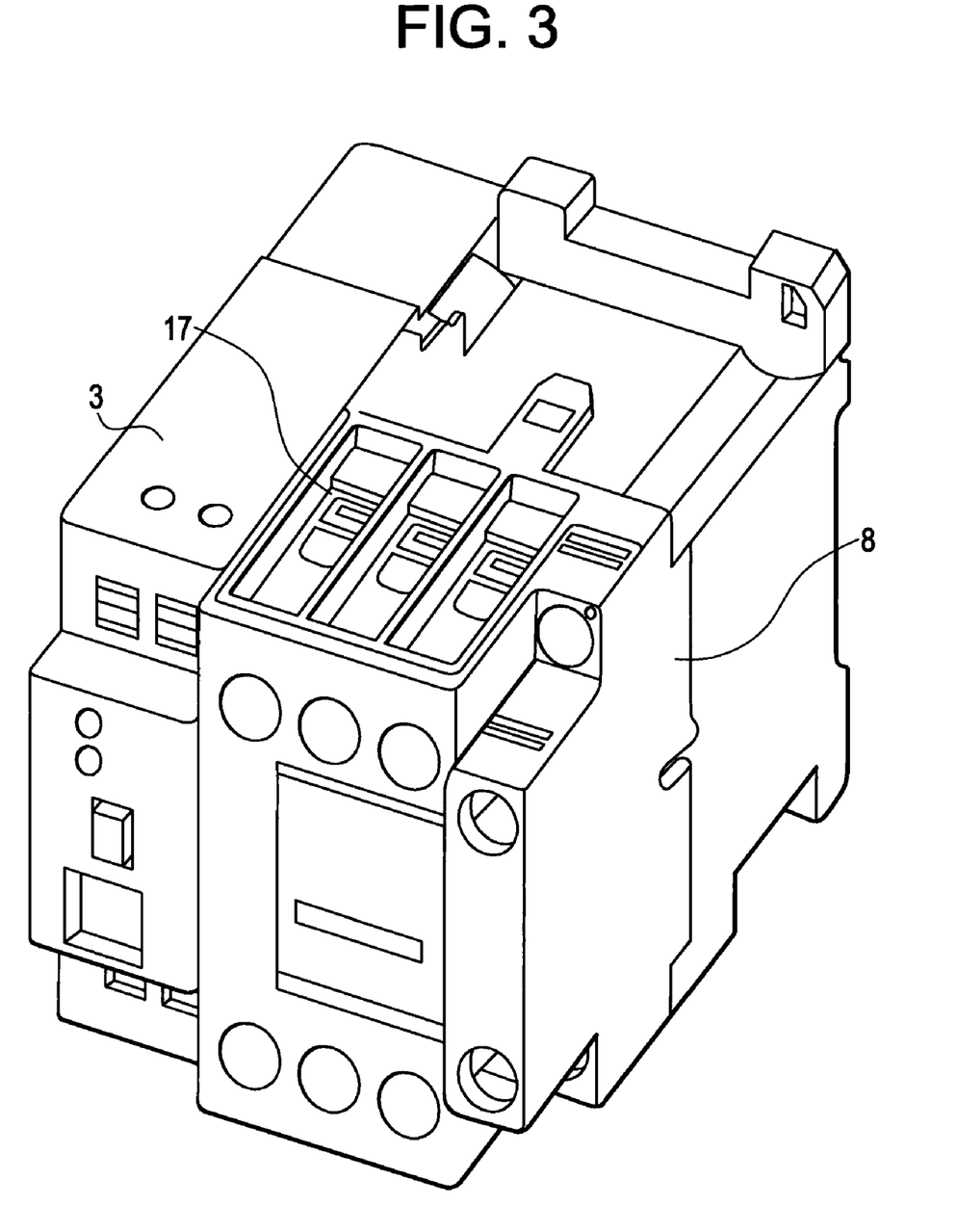
FIG. 3 is a diagram of AS-I communication module and an electromagnetic contactor that can be implemented within alternative embodiments of the present invention.
Figure 4:
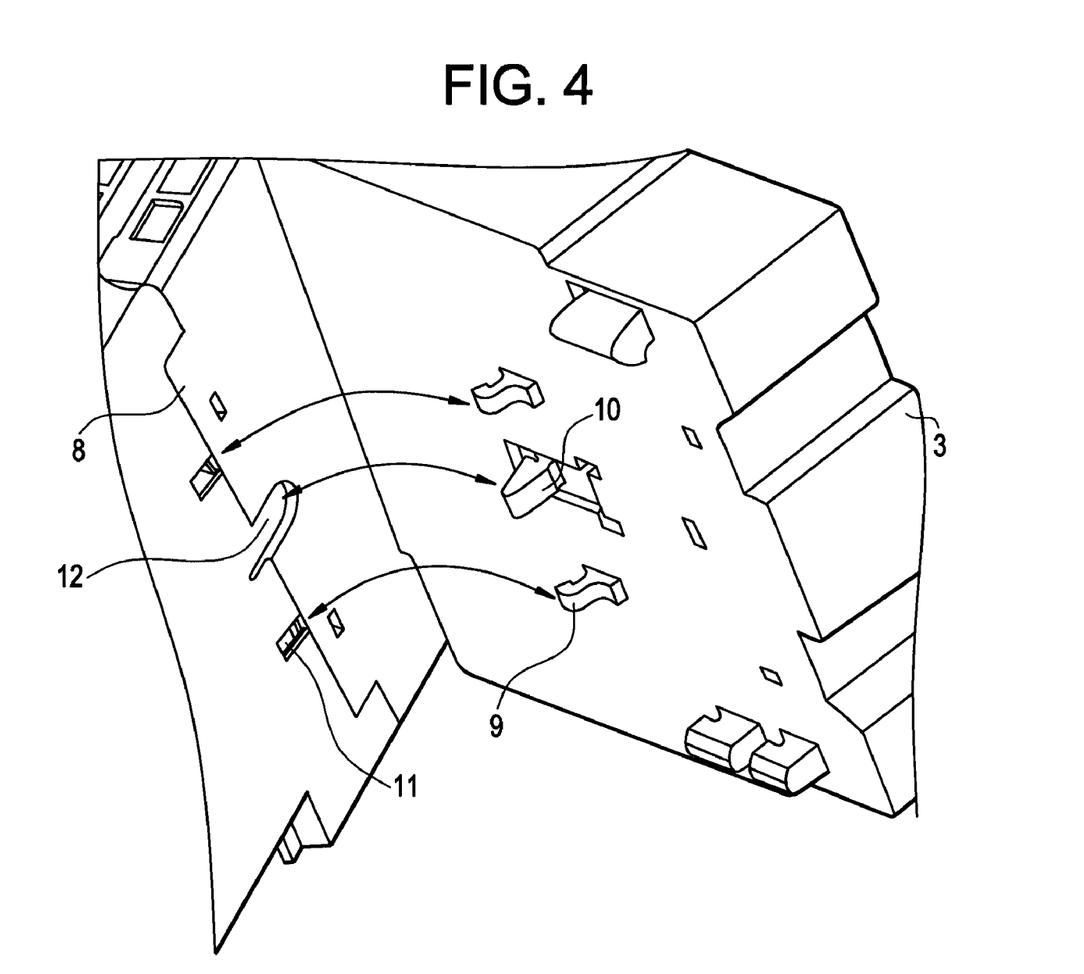
FIG. 4 is a diagram a connection between the AS-I communication module and the electromagnetic contactor as shown in FIG. 3 that can be implemented within embodiments of the present invention.

FIG. 2 is an AS-I communication network according to another exemplary embodiment of the present invention. As shown in FIG. 2, the AS-I communication network 1 includes a plurality of slave devices 3 in communication with one master device 2. The number of slave devices 3 may vary, which in an embodiment is up to a maximum of 62 slave devices per master device 2. However, since the maximum number of slave devices is design dependent, it will be appreciated that the scope of the invention is not limited to a particular maximum number. The AS-I communication network 1 further includes a device to be monitored and controlled, for example, an electromagnetic contactor (as depicted in FIGS. 3 and 4, for example) operatively connected to the slave device 3. The slave device 3 is configured to receive commands from the master device 2 via the AS-I communication bus 4, and to execute the commands to control the device. The connection between the device and the slave device 3 will now be described with reference to FIGS. 3 and 4.

As shown in FIG. 3, in one embodiment of the present invention, the slave device 3 is connected with a device such as an electromagnetic contactor 8. The present invention is not limited to being applied to an electromagnetic contactor, and any suitable AS-I compatible device may be used, for example, an overload relay. According to an exemplary embodiment of the present invention, the device is one of an electrical device, an electromechanical device or an electromagnetic device, for example. As shown in FIG. 4, the slave device 3 according to one embodiment of the present invention includes a plurality of hooks 9 and an AS-I latch 10. The slave device 3 is connected with the electromagnetic contactor 8 via the hooks 9 which are inserted into grooves 11 of the electromagnetic contactor 8. The AS-I latch 10 of the slave device 3 is inserted into a slot of a movable contact carrier 12 of the electromagnetic contactor 8. Addition details concerning the movable contact carrier 12 are described below with reference to FIG. 5.

Figure 5:
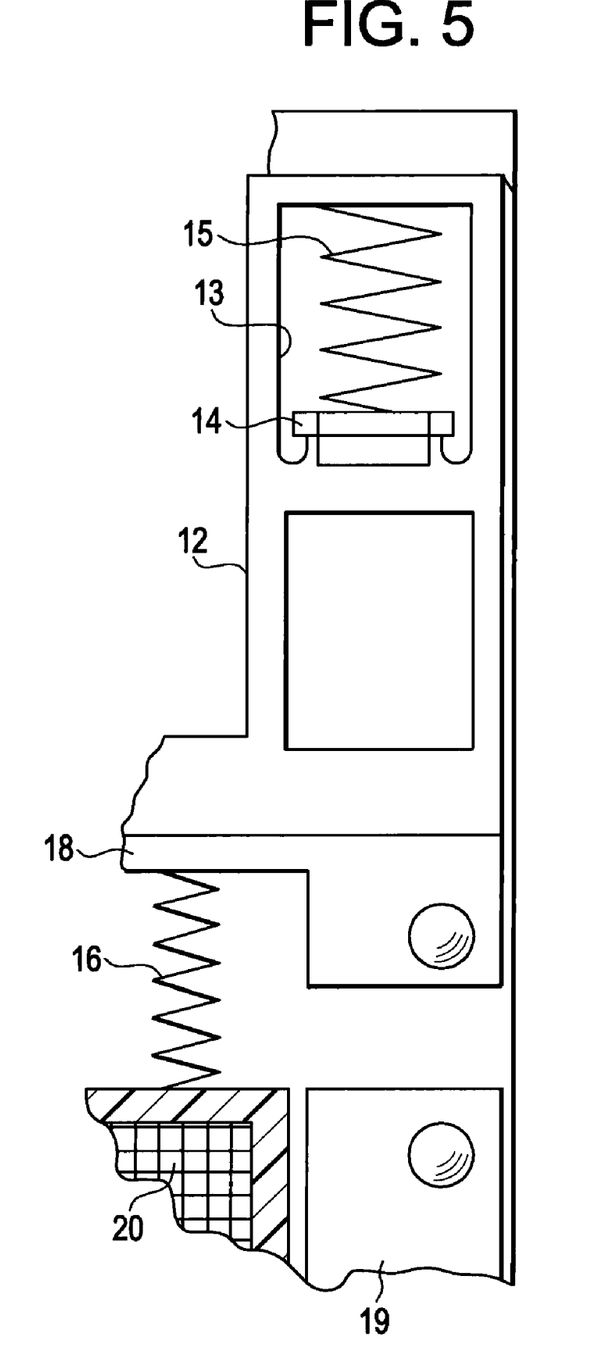
FIG. 5 is a fragmentary cross-sectional view taken through the electromagnetic contactor as shown in FIG. 4.

FIG. 5 is a fragmentary cross sectional diagram according to one embodiment of the present invention illustrating the movable contact carrier 12 of the electromagnetic contactor 8. As shown in FIG. 5, the movable contact carrier 12 includes a contact opening 13 in each pole in which a movable contact 14 is positioned (three poles for a three-phase device for example), and biased against a lower edge of the opening 13 by a spring 15. The movable contact 14 aligns with a fixed contact 17 (as depicted in FIG. 3) when in the closed position. The movable contact carrier 12 is attached to a movable armature 18, which cooperates with a fixed core 19 by energization of a coil 20 that creates a magnetic flux through the fixed core 19 and movable armature 18 and across an air gap. A spring 16 biases the movable armature 18 and movable contact carrier 12 away from the fixed core 19, while the energized coil 20 biases the movable contact carrier 12 toward the fixed core 19, thereby separating or enabling contact between the movable contact 14 and the fixed contact 17.

Figure 6:
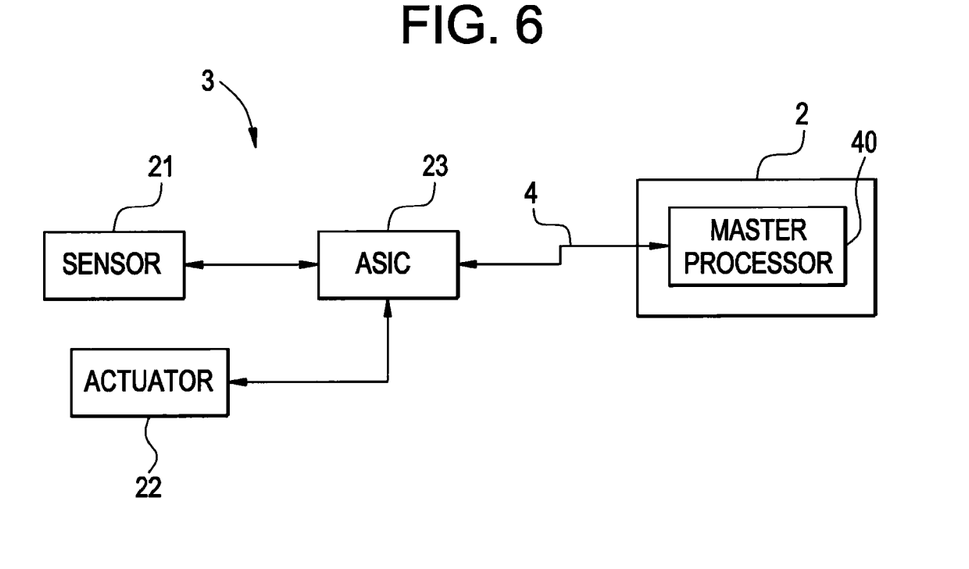
FIG. 6 is a block diagram of the AS-I communication module and AS-I master device that can be implemented within embodiments of the present invention.

FIG. 6 is a block diagram illustrating a master device 2 and a slave device 3 according to an exemplary embodiment of the present invention. As shown in FIG. 6, the master device 2 includes a master processor 40 (to be described later with reference to FIG. 7). The slave device 3 includes a sensor 21, an actuator 22, and a slave processor 23 such as an application specific integrated circuit (ASIC) responsive to computer executable instructions to establish a communication channel between the sensor 21, the actuator 22 and the master device 2. According to an exemplary embodiment, the slave device 3 is configured to receive commands from the master device 2 via the AS-I communication bus 4, and to control the electromagnetic contactor 8 based on the commands received from the master device 2. Thus, the master device 2 sends a command to the slave device 3 via the AS-I communication bus 4 to turn on the electromagnetic contactor 8. The slave device 3 receives the command from the master device 2 and energizes the actuator 22 to actuate the electromagnetic contactor 8. Further discussion on the control aspects of the communication system will be discussed later in reference to FIGS. 7-9.

According to an exemplary embodiment, the actuator 22 is a power relay that closes to connect a main power (not shown) to the coil 20 of the electromagnetic contactor 8 to cause the movable contact carrier 12 of the electromagnetic contactor 8 to move into an energized position and in turn to close the movable contacts 14 of the electromagnetic contactor 8. According to an exemplary embodiment, the sensor 14 senses a signal representative of the movement of the movable contact carrier 12. Alternatively, according to another exemplary embodiment, the sensor 14 may sense other parameters such as voltage, current, pressure or temperature of the electromagnetic contactor 8, for example. The slave device 3 sends the sensed signal to the master device 2 indicating whether the movable contact carrier 12 has moved. According to the current exemplary embodiment, the sensor 14 is an optical sensor. However, the present invention is not limited hereto, and any measuring device suitable for the purposes disclosed herein may be used. Further, the signal detected by the sensor 14 may be a flow detection signal, or any type of transducer signal (e.g., a digital signal). Based on the signal received from the slave device 3, the master device 2 identifies an operating state of the electromagnetic contactor 8 using an algorithm to be described below in reference to FIG. 7.

Figure 7:
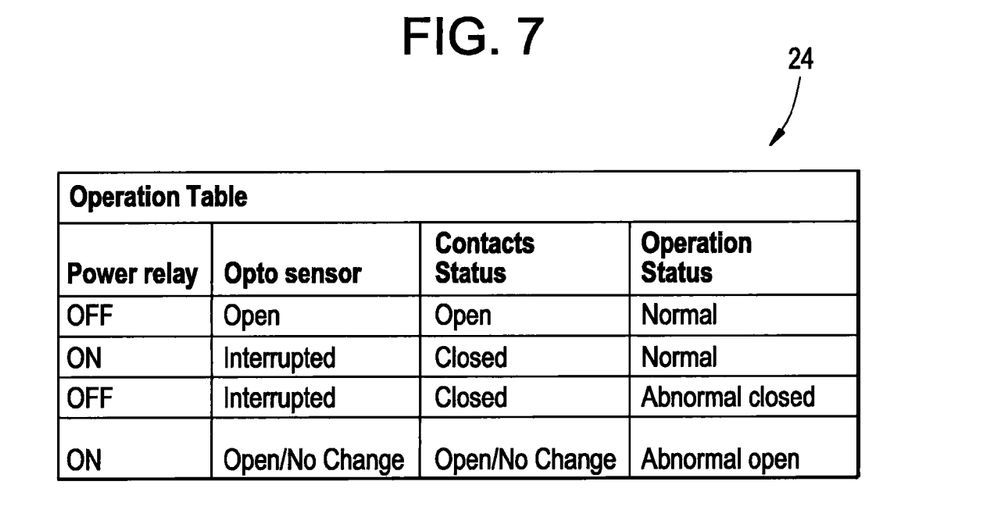
FIG. 7 is an operation table employed by an AS-I master device of the AS-I communication network that can be implemented within alternative embodiments of the present invention.

FIG. 7 is an operation table used by the master device 2 for detecting an operating state of the electromagnetic contactor 8, for example. According to an exemplary embodiment, the master device 2 includes a master processor 40 (as depicted in FIG. 6) which utilizes an algorithm corresponding to the operation table 24 to determine an operating state of the electromagnetic contactor 8 based on the sensed signal. That is, the operation table 24 includes parameters which are used to determine an operating state of the electromagnetic contactor 8. According to the present invention, the parameters of the operation table 24 may vary dependent upon the type of device being monitored and controlled by the master device 2. According to one embodiment, the master device 2 identifies an operating state of the electromagnetic contactor 8 based on the sensed signal received from the slave device 3.

As shown in FIG. 7, according to an exemplary embodiment, the operating state of the electromagnetic contactor 8 is one of a normal state, an abnormal closed state such as a contact weld state where the electromagnetic contactor 8 is closed when it is supposed to be open, or an abnormal open state such as a coil burn state where the electromagnetic contactor 8 is open when it is supposed to be closed. When the power relay 22 is in an off state, the sensor 21 senses a movement (i.e., an opening action) of the movable contact carrier 12, and the contacts 14 are open, the master device 2 determines that the electromagnetic contactor 8 is operating in a normal state. In addition, when the power relay 22 is actuated (i.e., in an on state) and the sensor 21 senses that the movement of the movable contact carrier 12 is interrupted and the contacts 14 are closed, the master device 2 determine that the electromagnetic contactor 8 is operating in a normal state.

On the other hand, when the power relay 22 is in an off state, and the sensor 21 senses that the movement of the movable contact carrier 12 is interrupted and the contacts 14 are closed, the master device 2 determines that the electromagnetic contactor 8 is in an abnormal closed state. When the power relay 22 is actuated and the sensor senses no change in the movement of the movable contact carrier 12 within a predetermined time after an ON command has been issued, and the contacts 14 are open, the slave device 3 sends a signal back to the master device 2 and the master device 2 determines that the electromagnetic contactor 8 is in an abnormal open state and the electromagnetic contactor 8 is considered to be inoperable. According to an exemplary embodiment, when the master device 2 determines that the electromagnetic contactor 8 is in an abnormal open state, the master device 2 promptly (within approximately 10 milliseconds for example) sends a signal back to the power relay 22 for the power relay 22 to go into an off state, in order to protect the coil 20 of the magnetic contactor 8. That is, if the movement of the movable contact carrier 12 of the electromagnetic contactor 8 is not sensed within a specified time period, supply to the coil 20 is terminated.

According to an exemplary embodiment of the present invention, the operating state of the electromagnetic contactor 8 as determined by the master device 2 is displayed on the display unit 5 (as depicted in FIGS. 1 and 2) to be viewed by a user.

Figure 8:
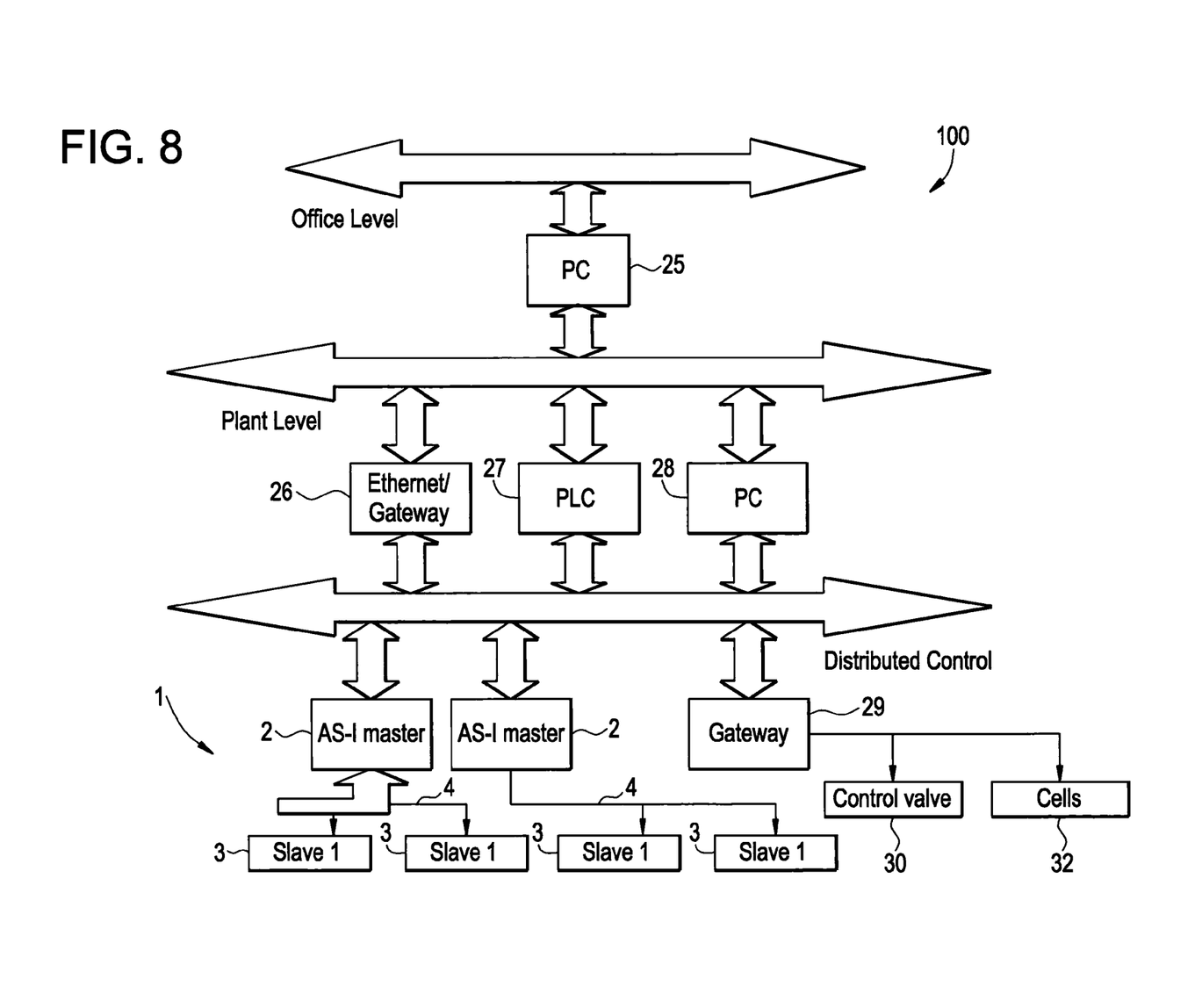
FIG. 8 is a block diagram of a communication system including an AS-I communication network that can be implemented within embodiments of the present invention.

According to another exemplary embodiment, the AS-I communication network 1 is a subsystem of a communication system as shown in FIG. 8. According to an exemplary embodiment, the communication system 100 may be a supervisory control and data acquisition communication system, for example. As shown in FIG. 7, the communication system 100 includes a personal computer (PC) 25 at an office level, interfacing with an Ethernet/Gateway 26, a PLC 27, and a PC 28 at a plant level. Further, the plant level interfaces with a distributed control level which includes the AS-I communication network 1 according to an exemplary embodiment of the present invention and a gateway 29 communicating with a control valve 30 and cells 32. As shown in FIG. 8, the AS-I communication network 1 includes a plurality of master devices 2 and a plurality of slave devices 3 communicating with the respective master devices 2.

Figure 9:
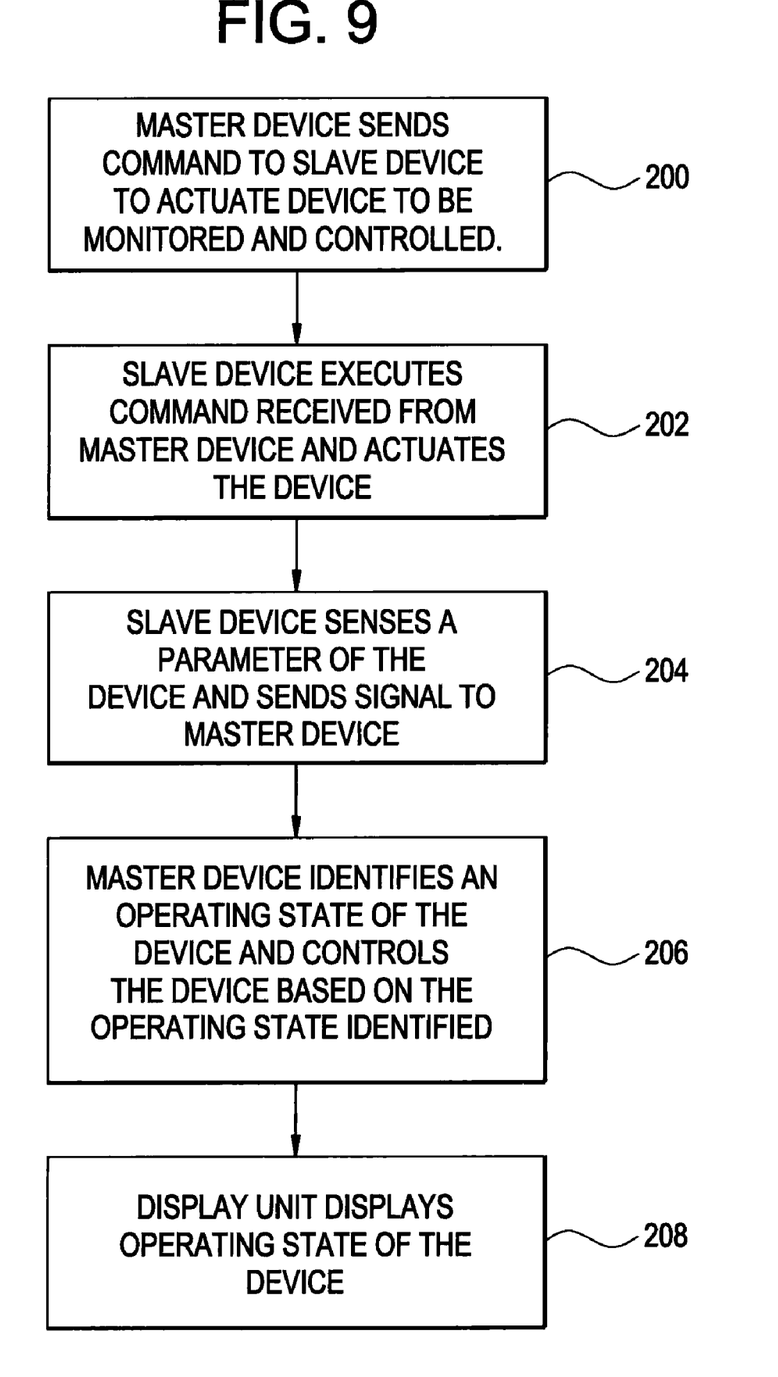
FIG. 9 is a flowchart illustrating a method of controlling an AS-I compatible device via an AS-I communication network that can be implemented within embodiments of the present invention.

FIG. 9 is a flowchart illustrating a method of controlling an AS-I compatible device via an AS-I communication network in accordance with an exemplary embodiment of the present invention. As shown in FIG. 8, at operation 200, the master device sends a command to the slave device via an AS-I communication bus, to turn on the device. From operation 200, the process moves to operation 202, where the slave device receives the command from the master device and processes the command and energizes an actuator to turn on the device. From operation 202, the process moves to operation 204 where the sensor of the slave device senses a signal representative of a parameter of the device. For example, if the device is an electromagnetic contactor, for example, the sensor senses a movement of the movable contact carrier of the electromagnetic contactor. From operation 204, the process moves to operation 206, where the master device identifies an operating state of the device and controls the device based on the operating state identified. For example, if the master device determines that the device is in an abnormal operating state, the master device sends a signal back to the slave device to de-energize the actuator, thereby de-energizing the device. For example, when the device is an electromagnetic contactor, if the master device determines that the electromagnetic contactor is in an abnormal closed state (e.g., a contact weld state) or an abnormal open state (e.g., a coil burn state), the master device sends a signal back to the slave device to de-energize the actuator, thereby de-energizing the electromagnetic contactor. From operation 206, the process moves to operation 208, where the operating state of the device is displayed via a display unit.

According to an exemplary embodiment of the present invention, the master device is capable of determining the operating status of an AS-I compatible device such as an electrical device, an electromechanical device or an electromagnetic device, for example, operatively connectable to a slave device, and controlling the device, which provides the benefits of lower manufacturing costs and greater accessibility.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A communication network comprising:
   a master device;
   an actuator-sensor-interface (AS-I) communication bus;
   a device configured to be monitored and controlled;
   a slave device in communication with the master device via the AS-I communication bus, the device configured to be monitored and controlled operatively connectable to the slave device, and the slave device configured to receive commands from the master device via the AS-I communication bus, and to execute the commands to control the device;
   an actuator disposed and configured to actuate the device; and
   a sensor disposed and configured to sense a position of contacts in the device configured to be monitored and controlled and send a signal indicative of the sensed position of contacts in the device configured to be monitored and controlled to the master device;
   wherein if the master device determines that the contacts are in an abnormal closed state, within a predetermined period of time the master device sends a signal to the actuator to change to an off state.

2. The communication network of claim 1, wherein the device comprises one of an electrical device, an electromechanical device, or an electromagnetic device.

3. The communication network of claim 2, wherein the slave device comprises a plurality of slave devices, and the device comprises a plurality of devices, wherein each device is operatively connected to a respective slave device of the plurality of slave devices.

4. The communication network of claim 2, wherein the slave device is configured to actuate the device based on the commands received from the master device.

5. The communication network of claim 1, wherein the sensor comprises an optical sensor disposed and configured to sense a position of the contacts.

6. The communication network of claim 5, wherein the slave device further comprises a slave processor responsive to computer executable instructions to control the actuator and the sensor.

7. The communication network of claim 6, wherein the master device further comprises a master processor responsive to computer executable instructions which when executed on the master processor determines an operating state of the device based on the sensed signal.

8. The communication network of claim 7, wherein the parameter includes one of an operation of the device, a movement, a current, a voltage, a temperature or a pressure at the device.

9. The communication network of claim 8, further comprising:
   a display unit connectable with the master device and configured to display the operating state of the device.

10. The communication network of claim 9, wherein the device is an electromagnetic contactor.

11. The communication network of claim 10, wherein:
    the master device is configured to send a command to the slave device instructing the slave device to actuate the electromagnetic contactor;
    the actuator is configured to actuate the electromagnetic contactor;
    the sensor is configured to sense a signal representative of a movement of a movable contact carrier of the electromagnetic contactor and sends the sensed signal to the slave processor and the slave processor sends the sensed signal to the master processor; and
    the master device is configured to determine an operating state of the electromagnetic contactor based on the sensed signal.

12. The communication network of claim 11, wherein the operating state of the electromagnetic contactor is one of a normal state, an abnormal closed state, or an abnormal open state.

13. The communication network of claim 11, wherein when no movement of the movable contact carrier is sensed by the sensor within a predetermined period of time after receiving an ON command, the slave device sends a signal to the master device, and the master device determines that the electromagnetic contactor is in an abnormal open state.

14. A communication system comprising:
   a communication network comprising:
      at least one master device;
      at least one AS-I communication bus;
      at least one device configured to be monitored and controlled;
      at least one slave device in communication with the master device via the AS-I communication bus, the device configured to be monitored and controlled operatively connectable to an associated slave device, and the associated slave device configured to receive commands from the master device via the AS-I communication bus, and to execute the commands to control the device;
      at least one actuator disposed and configured to actuate the device; and
      at least one sensor disposed and configured to sense a position of contacts in the device configured to be monitored and controlled and send a signal indicative of the sensed position of contacts in the device configured to be monitored and controlled to the master device;
      wherein if the master device determines that the contacts are in an abnormal closed state, within a predetermined period of time the master device sends a signal to the actuator to change to an off state.

15. The communication system of claim 14, wherein the device comprises one of an electrical device, an electromechanical device, or an electromagnetic device.

16. The communication system of claim 14, wherein the communication system is a supervisory control and data acquisition communication system.

17. A method for controlling a device via an AS-I communication network comprising, the method comprising:
   operatively connecting a slave device to the device to be controlled and monitored;
   sending commands by a master device to the slave device, via an AS-I communication bus;
   executing the commands via the slave device to control the device;
   wherein executing the commands via the slave device includes determining if contacts of the device are in an abnormal closed state, within a predetermined period of time the master device sends a signal to an actuator in operative communication with the device to change to an off state.

18. The method of claim 17, wherein executing the commands via the slave device further includes:
   actuating the device via the slave device based on the commands received from the master device;
   sensing a signal representative of a parameter of the device via the slave device;
   sending the sensed signal to the master device;
   identifying an operating state of the device via the master device based on the sensed signal; and
   controlling the device based on the identified operating state.

19. The method of claim 18, further comprising:
   displaying, via a display unit, the operating state of the device.

20. The method of claim 18, wherein the device is an electromagnetic contactor, and the operating state of the electromagnetic contactor is one of a normal state, an abnormal closed state or an abnormal open state.

* * * * *